United States Patent [19]

Costa

[11] Patent Number: 5,693,227

[45] Date of Patent: Dec. 2, 1997

[54] CATALYST MEDIATED METHOD OF INTERFACIAL POLYMERIZATION ON A MICROPOROUS SUPPORT, AND POLYMERS, FIBERS, FILMS AND MEMBRANES MADE BY SUCH METHOD

[75] Inventor: Lawrence C. Costa, Mansfield, Mass.

[73] Assignee: Ionics, Incorporated, Watertown, Mass.

[21] Appl. No.: 341,496

[22] Filed: Nov. 17, 1994

[51] Int. Cl.$^6$ .......................... B01D 61/00; B01D 67/00
[52] U.S. Cl. .................. 210/650; 210/490; 210/500.38; 96/14; 95/45; 427/245
[58] Field of Search .................... 427/245, 246; 210/490, 500.37, 500.38, 500.41, 650, 651; 96/14; 264/45.1; 95/45

[56] References Cited

U.S. PATENT DOCUMENTS

| | | | |
|---|---|---|---|
| 3,744,642 | 7/1973 | Scala | 210/500 |
| 4,259,183 | 3/1981 | Cadotte | 210/654 |
| 4,277,344 | 7/1981 | Cadotte | 210/654 |
| 4,286,085 | 8/1981 | Jaquiss et al. | 528/199 |
| 4,324,884 | 4/1982 | White et al. | 528/207 |
| 4,606,943 | 8/1986 | Rak et al. | 427/244 |
| 4,619,767 | 10/1986 | Kamiyama et al. | 210/490 |
| 4,643,829 | 2/1987 | Sundet | 210/500.33 |
| 4,761,234 | 8/1988 | Uemura et al. | 210/500.38 |
| 4,783,346 | 11/1988 | Sundet | 427/244 |
| 4,814,082 | 3/1989 | Wrasidlo | 210/490 |
| 4,828,708 | 5/1989 | Bray | 210/654 |
| 4,830,885 | 5/1989 | Tran et al. | 427/245 |
| 4,853,122 | 8/1989 | McCray | 210/321.89 |
| 4,872,984 | 10/1989 | Tomaschke | 210/500.38 |
| 4,948,506 | 8/1990 | Lonsdale et al. | 210/490 |
| 4,948,507 | 8/1990 | Tomaschke | 210/500.38 |
| 4,950,404 | 8/1990 | Chau | 210/500.27 |
| 5,006,628 | 4/1991 | Jackson, Jr. et al. | 528/182 |
| 5,019,264 | 5/1991 | Arthur | 210/500.37 |
| 5,051,178 | 9/1991 | Uemura et al. | 210/500.38 |
| 5,084,182 | 1/1992 | Arthur | 210/642 |
| 5,085,777 | 2/1992 | Arthur | 210/500.38 |
| 5,152,901 | 10/1992 | Hodgdon | 210/654 |
| 5,234,598 | 8/1993 | Tran et al. | 210/654 |
| 5,246,587 | 9/1993 | Tomaschke | 210/654 |

FOREIGN PATENT DOCUMENTS

| | | |
|---|---|---|
| 0040315A1 | 11/1981 | European Pat. Off. . |
| 3044654A1 | 7/1981 | Germany . |
| 3526622A1 | 1/1987 | Germany . |
| 281397 | 8/1990 | Germany . |
| 2152529 | 12/1990 | Japan . |
| 4358537 | 11/1992 | Japan . |
| WO 92/19665 | 11/1992 | WIPO . |

OTHER PUBLICATIONS

McCray, S., Bend Research, Inc., "The Mechanism of Halogen Attack on Composite Reverse–Osmosis Membranes—Phase II", Technical Report, Jan. 1991.
The Handbook of Industrial Membrane Technology (M.C. Porter, Ed., 1990) at 327–328.
Höfle, G. et al., Angew. Chem. Int. Ed. Engl. 17 (1978) at 569–583.
Scriven, E., Chemical Society Reviews, vol. 12, No. 2, 1983, "4–Dialkylaminopyridines: Super Acylation Catalysts" at 129–161.

*Primary Examiner*—Joseph W. Drodge
*Attorney, Agent, or Firm*—Lappin & Kusmer LLP

[57] ABSTRACT

The invention pertains to the polymerization of molecules having electrophilic and nucleophilic substituents on the same or different molecules, such polymerization mediated by aminopyridine catalysts which are substantially regenerated during polymerization. The invention also pertains to polymer products of such polymerization, to permselective membranes containing such polymers, and to processes and apparatus for separating fluids.

85 Claims, 2 Drawing Sheets

CATALYST MEDIATED METHOD OF INTERFACIAL POLYMERIZATION ON A MICROPOROUS SUPPORT, AND POLYMERS, FIBERS, FILMS AND MEMBRANES MADE BY SUCH METHOD

FIELD OF THE INVENTION

This invention is in the field of polymer chemistry and pertains to polymerization of molecules having electrophilic and nucleophilic substituents on the same or different molecules. Such polymerization is mediated by certain catalysts. This invention includes the polymers, fibers, films and membranes made by such mediated polymerization. Particularly the invention pertains to hollow fiber (including hollow fine fiber), sheet (including spiral wound sheet), and tubular membranes which comprise polymers prepared by polymerization mediated by aminopyridine catalysts. More particularly the invention pertains to asymmetric, polyamide, polyhydrazide, and/or polyurea membranes for use in Reverse Osmosis ("RO", also called Hyperfiltration ("HF")), Nanofiltration ("NF"), Ultrafiltration ("UF"), Pervaporation ("PV"), Diffusion Dialysis ("DD"), Gas Separation ("GS") and other membrane separation processes.

In particular, the permselective membranes of the invention are comprised of polymers prepared by the copolymerization of molecules having two or more primary or secondary amine substituents with molecules having two or more substituents such as isocyanate, carboxylic acid halides, sulfonic acid halides, N-haloformyl, O-haloformyl, carboxylic acid ester, and carboxylic acid anhydride substituents. Such polymerization is mediated by aminopyridine catalysts. Most particularly this invention pertains to cross-linked, polyamide, thin film composite ("TFC") membranes prepared by the interfacial polymerization of molecules having two or more primary or secondary amino groups with molecules having two or more carboxylic acid halide groups, where such polymerization is mediated by one or more aminopyridine catalysts.

BACKGROUND OF THE DISCLOSURE

Permselective, polymeric membranes (including TFC membranes) are employed in RO, NF, UF, PV, DD, GS and other membrane separation processes to effect at least partial separation of components in a fluid mixture. The membranes may be used in single sheet or multiple sheet units, in a spiral-wound configuration, as tubular membranes and as hollow fine fibers. The driving force for such separation may be, for example, a pressure gradient (e.g. RO, NF, UF, GS) or a concentration gradient (PV or DD). RO, NF, PV, DD and GS are thought to occur by a combination of (a) preferential absorption of one component (generally the "solvent" and typically water) from the above mentioned fluid mixture into the thin, dense skin or barrier layer of the permselective membrane and (b) preferential diffusion of the absorbed component through such barrier layer.

It is well known that among the most important applications of permselective membranes are the demineralization and softening of water by RO and NF respectively. For spiral wound membranes, commercially practical RO desalination of seawater generally requires a membrane flux of at least 0.6 cubic meter per day per square meter of membrane (i.e. 0.6 meter/day) at a pressure gradient of about 40–100 atmospheres with a salt rejection of preferably about 99%. In the case of brackish water (typically one-tenth the saline concentration of seawater) a membrane flux of at least 0.8 meter per day is required at not more than about 20 atmospheres pressure gradient and with a salt rejection of about 95%. For NF, whether applied to seawater, brackish water or potable water, high rejection of polyvalent ions (particularly cations) and low rejection of monovalent ions at minimum pressure gradient and at a flux of at least 0.8 meter per day are desirable.

In addition to the above examples of flux and salt rejection requirements (which, as noted, apply to RO and NF membranes), membranes preferably should have: high durability (for example, a useful economic life of at least 3 years, and preferably 5 years); resistance to bioadhesion, microbial adhesion, fouling by organic materials, and to other causes of flux decline such as compression or compaction; resistance to high or low pH fluctuation, or both; resistance to oxidants which may be present in the fluid processed (for example hypochlorite in seawater and brackish water); resistance to microbial degradation; or some combination of the above.

The prior art contains a multitude of references to the manufacture of permselective membranes as a class, to asymmetric membranes as a subclass, to TFC membranes as a sub-subclass and to polyamide TFC RO and NF membranes as a division of the latter. Polyamide TFC membranes are generally prepared by first saturating a microporous support material with an aqueous di- or polyamine solution, and then contacting this support with a water-immiscible organic solvent containing a di- or polyacid chloride, and allowing the monomers to interfacially polymerize. By way of example, U.S. Pat. No. 4,259,183 (assigned to the U.S. Government) pertains to interfacially polymerized TFC membranes prepared from a dilute, aqueous solution of piperazine ("Pip") and from a dilute solution of trimesoyl chloride ("TMC", 1,3,5-benzene tricarboxylic acid chloride) in a non-polar, volatile, water-immiscible solvent with or without isophthaloyl chloride ("IPC") as a co-reactant. Such TFC membranes have been found useful in NF and in RO of brackish water. U.S. Pat. No. 4,277,344 (also assigned to the U.S. Government) and U.S. Pat. No. 4,828,708 pertain to RO and NF membranes prepared in a manner similar to U.S. Pat. No. 4,259,183 except with 1,3-phenylene diamine ("MPD") used in place of piperazine.

Many variations on the above chemistries have been disclosed, e.g.:

substitution of 1,3,5-cyclohexane tricarboxylic acid chloride for 1,3,5-benzene tricarboxylic acid chloride (U.S. Pat. No. 4,643,829);

substitution of triamino benzene for piperazine or 1,3-phenylene diamine (U.S. Pat. No. 4,761,234);

substitution of 5-isocyanato-isophthaloyl chloride for 1,3,5-benzene tricarboxylic acid chloride (U.S. Pat. No. 5,019,264 and U.S. Pat. No. 5,084,182);

addition to the amine solution of a polyhydric compound e.g. ethylene glycol, propylene glycol, glycerin, polyethylene glycol, polypropylene glycol, copolymers of ethylene glycol and propylene glycol, backbone glycols having from 4 to 12 carbon atoms and mixtures thereof (U.S. Pat. No. 4,830,885).

condensation of the diamine and the diacyl chloride in the presence of a monomeric amine salt (U.S. Pat. No. 4,948,507);

substitution of an amine-terminated condensation terpolymer of 1,3-phenylene diamine, trimesoyl chloride and trimellitic anhydride chloride for MPD (U.S. Pat. No. 4,606,943);

substitution of 5-chloroformyloxy isophthaloyl chloride for trimesoyl chloride (U.S. Pat. No. 5,085,777 and U.S. Pat. No. 5,246,587.

The above U.S. Pat. Nos. 4,259,183; 4,277,344; 4,606,943; 4,643,829; 4,761,234; 4,828,708; 4,830,885; 5,019,264; 5,084,182; 5,085,777 and 5,246,587 are incorporated herein by reference.

In separation processes employing the above membranes, optimal performance may be achieved using uniform membranes having the desired flux and salt rejection characteristics in well defined ranges. However, during membrane formation using prior art methods, structurally irregular regions typically occur, resulting in sub-optimal performance. Such irregular regions may include pinholes, voids, regions of relatively low polymer density, regions of relatively low polymer cross-linking, and regions of undesirable surface roughness. Irregular regions also include regions of undesirable thickness or extended polymer projections which impede flux and adversely affect membrane performance.

SUMMARY OF THE INVENTION

Figure 1:
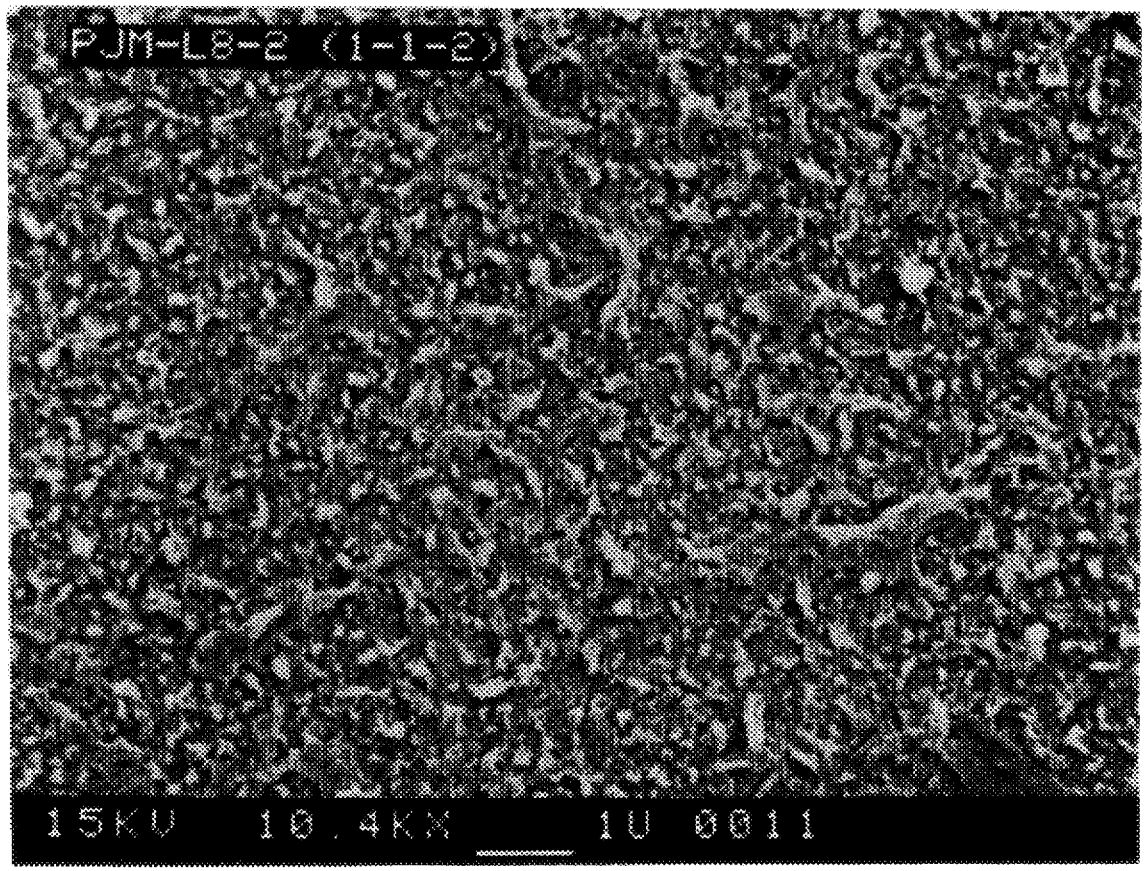
FIG. 1 shows an SEM micrograph (10,000×) of the top surface of a commercially available (prior art) polyaramide membrane formed by interfacial polymerization of 1,3-phenylene diamine and trimesoyl chloride.

This invention pertains to catalytic control of thin film polymer formation and thin film composite (TFC) membrane performance characteristics by the use of alkylaminopyridine compounds. This invention provides TFC polymer compositions with substantially smooth surfaces and substantially few ridge-and-valley formations. This invention also provides polymer compositions formed by stepwise condensation of electrophilic monomers and nucleophilic monomers mediated by one or more alkylaminopyridine catalysts. These compositions particularly include improved TFC membranes formed from combinations of monomers that previously produced polymers which were highly unsuitable for commercial use. This aspect of the invention encompasses both electrophilic monomers and nucleophilic monomers having slower reaction rates than, for example, trimesoyl chloride or phenylenediamine, respectively. The polymers of the present invention are substantially improved through the use of the alkylaminopyridine compounds.

As an example, this invention further provides an interfacial method of polyamide condensation on a polysulfone microporous support. This invention is based, in part, on the finding that adding small amounts of an alkylaminopyridine such as 4-DMAP to an aqueous solution of a nucleophilic monomer such as m-phenylenediamine creates, upon interfacial polymerization with an electrophilic monomer, a TFC membrane having a significantly increased flux and a substantially smooth surface appearance. (See Example 1).

Objects of this invention include:
- to control the rate of polymerization of molecules having electrophilic and nucleophilic substituents to obtain desired properties in the resulting polymer;
- to control the formation of the permselective barrier layer of TFC permselective membranes to obtain desired or improved properties in such layer;
- to control the formation of the permselective barrier layer of polyamide TFC membranes to obtain desired or improved RO and/or NF properties in such layer;
- to provide polyamide TFC membranes having desired or improved properties by controlling the interfacial polycondensation of the di- and/or tri-amines and di- and/or tri-acid halide precursors of such membranes;
- to provide practical polyamide TFC membranes from monomer combinations, such as di- and/or tri-amines and/or di- and tri-acid halides, which have not until now resulted in practical membranes.

In accordance with the above and other objects (which will become obvious from the following disclosure and appended claims), this invention pertains to control of the formation of thin films of polyamide and/or polyurea TFC membranes by interfacial polymerization and to control of the flux and rejection characteristics of such membranes through the controlled addition of one or more catalysts to one or both of the fluid phases used in such interfacial polymerization. The preferred catalysts do not react irreversibly with any of the components in either of such phases. The most preferred catalysts are tertiary aminopyridines, i.e. nucleophilic compounds having the formulas:

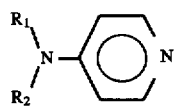

where R1 and R2 may be alkyl groups or taken together are a cyclic alkyl group of between 4 and 8 carbon atoms or hetero atoms. Examples are:

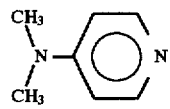
4-dimethylaminopyridine
DMAP

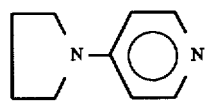
4-pyrrolidinopyridine
PPY

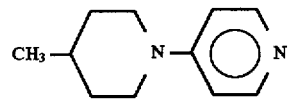
4-(4-methylpiperidino)-pyridine
MPP

DETAILED DESCRIPTION OF THE INVENTION

The term "catalyst" is meant to include tertiary amines which possess the ability to do one or more of the following: increase the overall rate of polymerization; chemically or electronically activate the electrophilic substituent bearing molecules; generate polar, hydrophilic sites within the polymer composition; or combinations thereof. The use of such catalysts in the process of the invention results in thin films with substantially smooth surfaces, such as may be determined with SEM.

The catalysts contemplated in this invention are preferably regenerated, although some small amount of catalyst may be trapped during the polymerization process in the polymer network, or remain unreacted. Where "catalyst" is used, it is understood to include combinations of one or more catalysts.

A preferable use for the polymers and barriers of this invention is in separation of fluid mixtures. A fluid mixture may be a mixture of fluids such as gases, water; dissolved solutes such as organic and inorganic solutes or ions, carbohydrates; and insoluble particulate matter such as insoluble salts. The term "permeating fraction" is meant to include one more fractions which have passed from one side of a polymer or barrier to another side. The passage may be assisted for example, by a pressure gradient, a concentration gradient, or an electric potential, or a combination thereof. The membrane polymers of this invention may be used in a process or an apparatus for the separation of portions of a fluid mixture for example, as in the treatment of water.

The term "permselective" is meant to describe a barrier material that preferentially inhibits passage of, or rejects, certain dissolved species or solvents and preferentially permits other dissolved species or solvents to permeate through the barrier. By way of example, most membranes of this invention preferentially reject dissolved inorganic salts and permit water to permeate the barrier.

The interfacial polymerization process, used to make some TFC membranes, is in essence a self-limiting process. At the solution interface a thin film is formed by polymerization. For example, di- and/or triamines from one phase (optionally containing a surfactant or an acid acceptor such as sodium hydroxide or a tertiary amine) interfacially polymerize with di- and/or tri-acid halides (alternatively di- and/or tri-isocyanate) from another phase which is substantially insoluble in the first phase.

Such polymerization may continue as long as there are interstices in the thin film through which one or both of the reactants may diffuse. Without intending to be bound, it appears that if the reaction rate of the amine with the acid halide (or isocyanate) is slow compared to the diffusion rate of such compounds, then comparatively thick, gelatinous films will be formed rather than the desired thin, dense films. The films preferably bridge the pores in the microporous substrate (which pores may typically be 500 Angstroms or more in characteristic width) and resist rupture under operating pressures. Resistance to rupture depends, in part, upon the size of the largest pores in the substrate and the inherent strength and thickness of the films. To obtain an optimal combination of flux and rejection, it is desirable that the films be uniformly dense and thin on an ultramicroscopic scale, i.e. on a scale of the order of a few hundred Angstroms. Such small scale uniformity or lack thereof is revealed in electron micrographs of the films.

The desired uniformity is not so easy to obtain in practice and in general there will be some ultramicroscopic regions which are thicker than the average and may therefore have lower flux; other or the same regions which are less cross linked than the average and therefore may have lower rejection; etc. It appears that, other things being equal, more rapid interfacial copolymerization reaction will result in a more uniform film. Further, some amines and some acid halides (or other electrophilic substituents) which otherwise might be useful for one or more specific applications of TFC membranes, are impractical because of, for example, insufficient reactivity leading to weak films, or films with low flux and/or poor rejection performance. Examples are xylylene diamines, diphenyl ether disulfonyl chloride and di-anhydrides or anhydride-acid halides.

Although it is not intended that this invention be limited by any theory, it appears that nucleophilic catalysts suitable for this invention react according to the following equations:

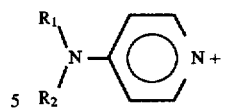

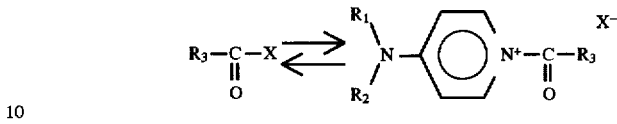

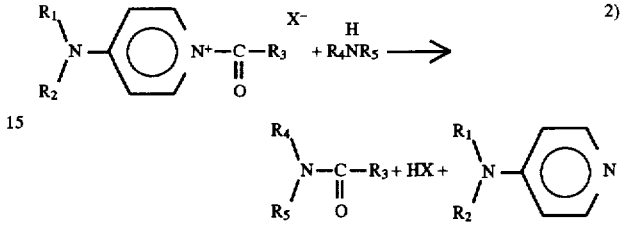

Eq.(1) represents a rapid, apparently reversible reaction between the nucleophilic catalyst

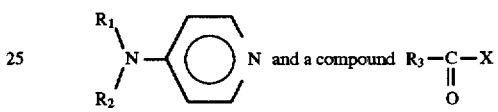

having an electrophilic moiety $$-\underset{\underset{O}{\|}}{C}-X$$

giving a labile intermediate

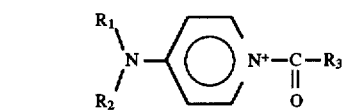

The latter in turn reacts rapidly with a nucleophile $$R_4-\underset{\underset{}{\overset{H}{|}}}{N}-R_5$$

according to Eq. (2) giving the product

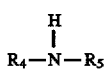

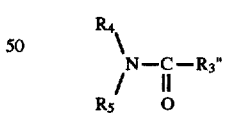

and regenerating the catalyst. In the above $R_3$ represents for example:

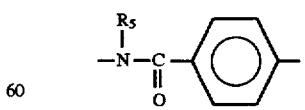

(that is a growing polymer ending in

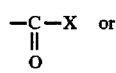

or

-continued

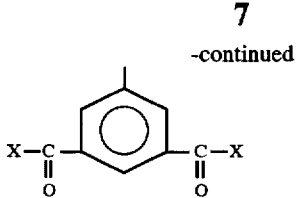
(b)

(that is a monomer moiety having one or two electrophilic groups).

X represents, for example, F, Cl, Br, I or

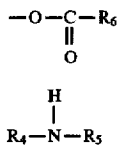

represents for example:

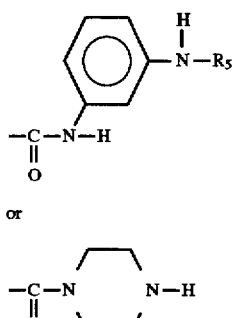
(c)

or

(d)

that is, with respect to the above two formulas, a growing polymer ending in

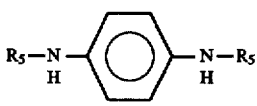

or

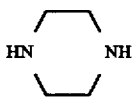
(f)

(that is, with respect to the above two formulas, a monomer having two or more nucleophilic substituents). R₅ may be H or an alkyl group. (In the case of piperazine R4 and R5 represent together the heterocyclic ring).

Nucleophilic Monomers

The term "nucleophilic monomer" encompasses monomers with two or more nucleophilic functional groups capable of forming a polymer with a selected electrophilic monomer. Depending on the size of the compound, more than two nucleophilic functional groups may be accommodated to promote crosslinking. For example, for monocyclic compounds, two or three nucleophilic functional groups are preferable. For this purpose of this invention, "nucleophilic monomer" encompasses any compound with at least two nucleophilic functional groups which react in a manner analogous to the amines in the polymerization reactions described herein. Nucleophilic functional groups include amino, hydroxyl, mercaptan, amide and other functional groups with a replaceable hydrogen atom.

By way of example, nucleophilic monomers having amino groups as the nucleophilic functional group include: (a) aromatic primary diamines, such as a m-phenylenediamine and p-phenylenediamine and substituted derivatives thereof, wherein the substituent includes, e.g., an alkyl group, such as a methyl or ethyl group; an alkoxy group, such as methoxy or ethoxy; a hydroxyalkyl group; a hydroxy group or a halogen atom; nitro groups; cyano groups; carboxylic or sulfonic acid groups; amide groups; (b) aromatic primary triamines, such as 1,2,4-and 1,3,5-triaminobenzene; (c) aromatic secondary diamines, such as N,N'-diphenylethylene diamine, N-methyl-m-phenylenediamine, N,N'-dimethyl-m-phenylenediamine, and the like; (d) cycloaliphatic primary diamines, such as cyclohexane diamine; (e) cycloaliphatic secondary diamines, such as piperazine and trimethylene dipiperidine; and (f) xylene diamines such as m-xylenediamine.

Aliphatic nucleophilic monomers include both straight chain and branched hydrocarbons containing 2–15 carbon atoms, inclusive, with at least two amino groups. Determination of the number and size of branches or substitutions is intended to permit satisfactory polymer formation. Thus, sterically hindered amines, or a branched structure with two amino groups very close together should be avoided for polymer membrane formation, although such amines may be desirable for linear or oligomer fiber formation.

Nucleophilic monomers include diamine compounds of the following formula:

$$HR^3N-R^1-A-R^2-NHR^4$$

wherein A represents a aliphatic, heterocyclic, or aromatic group, i.e. a group having 2 to 8 carbon atoms, inclusive, a divalent alicyclic group, a divalent aromatic group, or a divalent heteroaromatic group;

where $R^1$ and $R^2$ are each an independently selected alkylene or alkenylene group having from 0 to 8 carbons atoms, inclusive; and wherein $R^3$ and $R^4$ are independently selected from the group consisting of: hydrogen; halogen; aliphatic, heterocyclic, or aromatic group, i.e. a group having from 2 to 8 carbon atoms, inclusive; a divalent alicyclic group, a divalent aromatic group, or a divalent heteroaromatic group. In addition, $R^1$ and $R^3$, for example, may be taken together to be a heterocyclic or alicyclic group.

Preferred nucleophilic substituents include primary amino, secondary amino, primary phosphino, secondary phosphino, sulfhydryl and hydroxyl substituents.

The positional geometry of the nucleophilic substituents of aromatic monomers may be ortho, or preferably meta or para to allow suitable cross-linking and extension without steric hindrance. The positional geometry may depend upon the length and geometry of $R^1$ and $R^2$. Additional and optional substituents on A, such as halogen, may have any positional geometry in general accordance with the principles of electronic effects of cyclic compounds. In addition to the diamine compounds described above, analogous triamine compounds may also be used. Additional examples of individual nucleophilic monomers are provided by U.S. Pat. No. 4,830,885 (C. N. Tran,et al.), U.S. Pat. No. 4,761,234 (T. Uemura,et al.), and U.S. Pat. No. 4,619,767 (Kamiyama et al.). Nonlimiting examples of aromatic amines known to produce commercially useful polymer membranes are m-phenylenediamine, p-phenylenediamine, and p-xylenediamine. Preferred nucleophilic monomers include aromatic primary diamines and triamines. Nonlimiting examples of newly-enabled nucleophilic monomers include m-xylenediamine and substituted derivatives thereof, wherein the substitutions are as described above.

For example, the analogs of the above amine compounds, substituting other nucleophilic functional groups such as those described above, are encompassed by the term "nucleophilic monomer." The considerable breadth of this term and other terms herein is supported by the broadly applicable catalytic mechanism upon which this invention is, in part, based.

Suitable nucleophilic monomers include:

polyethylenimines;

reaction products of ethylene diamine, piperazine, methyl piperazine, dimethyl piperazine and/or homopiperazine with a polyepihalohydrin;

amine terminated polyamide oligomers (e.g. copolymers of isophthaloyl chloride with an excess of meta phenylene diamine);

cyclohexane diamines;

cyclohexane triamines;

xylylene diamines;

phenylene diamines (e.g. meta phenylene diamine and para phenylene diamine);

chlorophenylene diamines (e.g. 4-or 5-chloro-metaphenylene diamine);

benzene triamines (e.g. 1,3,5-benzene triamine);

bis (aminobenzyl) aniline;

tetra amino benzenes;

tetra amino biphenyls (e.g. 3,3',4,4,' tetra amino biphenyl;

tetrakis (aminomethyl) methane;

piperazine;

methyl piperazine;

dimethyl piperazine (e.g. 2,5-dimethyl piperazine);

homopiperazine;

diamino-diphenyl methanes;

N,N'-diphenyl ethylenediamine;

aminobenzamides (e.g. 4-amino-benzamide);

aminobenzhydrazides;

bis(aminobenzyl)anilines;

bis(alkylamino)phenylenediamines (e.g. N,N'-dimethyl-1,3-phenylenediamine)

melamine;

mono(alkylamino)phenylenediamines (e.g. N-methyl-1, 3-phenylenediamine).

aminomethylpiperidine triamino-hydroxy-pyrimidines (e.g. 2,4,5-triamino-6-hydroxy pyrimidine or 4,5,6-triamino-2-hydroxy pyrimidine);

triamino-pyrimidines (e.g. 2,4,6-triamino-pyrimidine or 4,5,6-triamino-pyrimidine);

tetra amino pyrimidines (e.g. 2,4,5,6-tetra amino pyrimidine);

para rosaniline;

tris (aziridinyl) propionates (e.g. trimethylol propane-tris (β-(N-aziridinyl) propionate or penta-erythritol-tris β(N-aziridinyl) propionate).

tetra amino biphenyls;

bis(amino benzyl)anilines.

Preferred nucleophilic monomers include triaminobenzene, piperazine, 4-aminomethylpiperidine, 1,4-phenylene diamine ("PPD"), 1,3-phenylene diamine ("MPD") of which the latter is most preferred.

Electrophilic Monomers

The term "electrophilic monomer" includes compounds having at least two or more electrophilic substituents which are capable of reacting with primary and secondary polyamino compounds, secondary diamino compounds related to piperazine, or any other nucleophilic functional group possessing a replaceable proton such as the hydroxyl group, amide groups, mercaptan groups, or combinations thereof. Nonlimiting examples of electrophilic functional groups are halogensulfonyl groups, N-haloformyl groups haloformate groups, acid anhydride groups and multifunctional isocyanates. Additional examples are provided by U.S. Pat. No. 4,830,885 (C. N. Tran, et al.) U.S. Pat. No. 4,761,234 (T. Uemura, et al.) and U.S. Pat. No. 4,619,767 (Y. Kamiyama et al.).

Suitable electrophilic monomers include:

acid halide-terminated polyamide oligomers (e.g. copolymers of piperazine with an excess of isophthaloyl chloride);

benzene dicarboxylic acid halides (e.g. isophthaloyl chloride or terephthaloyl chloride);

benzene tricarboxylic acid halides (e.g. trimesoyl chloride or trimellitic acid trichloride);

cyclohexane dicarboxylic acid halides (e.g. 1,3-cyclohexane dicarboxylic acid chloride or 1,4-cyclohexane dicarboxylic acid chloride);

cyclohexane tricarboxylic acid halides (e.g.cis-1,3,5-cyclohexane tricarboxylic acid trichloride);

pyridine dicarboxylic acid halides (e.g. quinolinic acid dichloride or dipicolinic acid dichloride);

trimellitic anhydride acid halides;

benzene tetra carboxylic acid halides (e.g. pyromellitic acid tetra chloride);

pyromellitic acid dianhydride;

pyridine tricarboxylic acid halides;

sebacic acid halides;

azelaic acid halides;

adipic acid halides;

dodecanedioc acid halides;

toluene diisocyanate;

methylene bis (phenyl isocyanates);

naphthalene diisocyanates;

bitolyl diisocyanates;

hexamethylene diisocycanate;

phenylene diisocyanates;

isocyanato benzene dicarboxylic acid halides (e.g. 5-isocyanato isophthaloyl chloride);

haloformyloxy benzene dicarboxylic acid halides (e.g. 5-chloroformyloxy isophthaloyl chloride);

dihalosulfonyl benzenes (e.g. 1,3-benzene disulfonic acid chloride);

halosulfonyl benzene dicarboxylic acid halides (e.g. 3-chlorosulfonyl isophthaloyl chloride);

cyclobutane dicarboxylic acid halide;

piperazine -N-N'-diformyl halides;

dimethyl piperazine -N,N-diformyl halides;

xylylene glycol dihaloformates;

benzene diol di-haloformates;

benzene triol trihaloformates;
phosgene;
diphosgene;
triphosgene;
N,N'-carbonyl diimidazole;
isocyanuric acid -N,N',N"-triacetyl halide;
isocyanuric acid-N,N',N" tripropionyl halide.
cyclopentane tetracarboxylic acid halides Preferred electrophilic monomers include terephthaloyl chloride, toluene diisocyanate, trimellitic anhydride acid chloride, 5-isocyanato isophthaloyl chloride, 5-chloroformyloxy isophthaloyl chloride, 5-chlorosulfonyl isophthaloyl chloride, isophthaloyl chloride and trimesoyl chloride of which the last six are most preferred.

In addition to the above monomer descriptions, the invention is intended to encompass combinations or mixtures of monomers which may further control polymer performance. Nonlimiting examples of nucleophilic monomer combinations are: (i) a mixture of diamines and triamines, (ii) a mixture of meta- and para- substituted phenylenediamines, and (iii) a mixture of xylenediamines and phenylenediamines.

Additional combinations or mixtures may be prepared of electrophilic monomers. Note in particular that where there is a combination of diacyl chlorides and/or triacyl chlorides, one of these acyl chlorides may preferentially react with the alkylaminopyridine catalyst, especially at lower temperatures. This may allow semi-selective determination of one acyl chloride which will form the initial oligomer network, and thereby favoring the subsequent "filling in" by other acyl chlorides.

Microporous Support

The term "microporous support" includes a support material having a surface pore size in the approximate range 50 to 5000 Å. The pore sizes should be sufficiently large so the permeate solvent can pass through the support without reducing the flux of the composite. However, the pores should not be so large that the permselective polymer membrane will either be unable to bridge or form across the pores, or tend to fill up or penetrate too far into the pores, thus producing an effectively thicker membrane with potentially lower flux. U.S. Pat. Nos. 4,814,082 (W. J. Wrasidlo) and 4,783,346 (S. A. Sundet) are illustrative of methods of choosing and preparing a microporous support for interfacial TFC formation.

Nonlimiting examples of the material forming the microporous support include polysulfone, polyether sulfone, polyacrylonitrile, cellulose ester, polypropylene, polyvinyl choride, polyvinylidene fluoride and poly(arylether) ketones. Other porous materials might be used as well, such as ceramics, glass and metals, in a porous configuration. Those of ordinary skill in the art will be able to make the selection from among the suitable materials in the art. Polyether sulfones and especially polysulfones are generally more preferable because these materials are readily available, have desirable physical and chemical properties, and are generally recognized as safe for use in food and pharmaceutical preparation.

The thickness of the material forming the microporous support may be between 3 and 10 mils thick, although other thicknesses may be used. For example, a one mil thick microporous support permits production of higher flux films. In some cases, the microporous support may be relatively thick, for example, one inch or more, where aqueous solution is applied to only one side, which is subsequently contacted with the organic solution, forming the interface at which polymerization occurs. The microporous support may be reinforced by backing with a fabric or a non-woven web material. Non-limiting examples include films, sheets, and nets such as a nonwoven polyester cloth. The polymer may permeate through the pores, be attached on both sides of the support, or be attached substantially on one side of the support.

One embodiment of the invention is an improved interfacial condensation forming polyamides on microporous supports, the latter comprising polysulfone, polyether sulfone, polyether ketone, polyetherether ketone, polyvinylidine fluoride, chlorinated polyvinyl chloride, polyamide and the like. One or more tertiary aminopyridines are added to the amine phase and/or the acid halide phase resulting in improved control properties of the final TFC membrane.

Catalysts

The term "nucleophilic catalysts" includes alkylaminopyridines having two N-alkyl substituents. It is thought that the dialkyl amino group of such compounds enhances the resonance stabilization of the putative N-pyridinium salt intermediate formed by the nucleophilic attack of the catalyst upon the electrophilic monomer. The amount of the catalyst is determined, in part, by the solvents, temperature, type of monomers used, and the desired performance characteristics. The catalysts have preferably two alkyl substituents. Non-limiting examples include 4-dimethylaminopyridine (DMAP), 4-pyrrolidinopyridine (PPY), and 4-(4-methylpiperidino)pyridine (MPP). A person of ordinary skill can determine the amount of the alkylaminopyridine catalyst by considering, in part, the nucleophilicity of the catalyst, the number and basicity of the amine groups per nucleophilic monomer, the number and degree of activated cross-linking functional groups per electrophilic monomer, the solvents used, the temperature. Generally, a range of from about 0.01 to 2.0 weight percent (wt %) is preferable.

Although the tertiary aminopyridines are presently most preferred as catalysts for polymerizations according to this invention it will be obvious to those skilled in the art that other nucleophilic or electrophilic catalysts may also be used. Examples include boric acid, imidazole and certain metal alkoxides e.g. titanium or zinc alkoxide. Preferred catalysts are regenerated during the polymerization reactions and are not irreversibly bound or destroyed by components of any of the interfacially polymerizing phases. Such catalysts (including the most preferred tertiary aminopyridines) may however become "trapped" to some extent in the rapidly growing polymer and inaccessible to Eqs. (1) and/or (2) above. Such entrapment may confer some advantage to the resulting TFC membrane depending upon the monomers used in the interfacial polymerization and the intended use of the resulting TFC membrane.

The invention provides polyamide, polyhydrazide, polyurea, polyurethane, or mixed polyamide-polyurea-polyurethane TFC membranes in which the thin, permselective barrier films generally have substantially fewer "ridge-and-valley" formations as compared with prior art membranes prepared from the same amines and electrophilic monomers. (See FIGS. 1 and 2).

In addition the invention provides improved membranes formed from combinations of amines and electrophilic monomers which previously produced membranes which were unsuitable for practical use. The latter aspect of the invention encompasses amines and/or acid halides which give polymerization rates significantly slower, for example, than the rate of condensation of metaphenylene diamine and trimesoyl chloride. Such amines include xylylene diamine; such acid chlorides include the sulfonyl chlorides or mixed acid chlorides of sulfonic acids and carboxylic acids or compounds containing both sulfonic acid and carboxylic acid chlorides.

This invention also provides a method for more easily making desired or novel aliphatic polyamides, aromatic polyamides, mixed aliphatic-aromatic polyamides, polyureas, polyurethanes and polyesters by interfacial polymerization. In addition to TFC membranes of sheet, tubular or hollow fiber configuration, the method may be used to make fibers (including hollow fibers) for other purposes.

Methods of Making Polymers

An interfacial method of this invention comprises the steps of: (a) forming a substantially aqueous mixture of one or more nucleophilic monomers and one or more alkylaminopyridine catalysts; (b) transferring the mixture of the nucleophilic monomers and catalysts to a microporous support; (c) establishing an essentially organic solvent volume containing one or more electrophilic monomers; and (d) contacting the nucleophilic monomer-carrying microporous support with said organic solvent volume to allow condensation polymerization. This method makes a substantially uniform thin film composite polymer membrane adjacent to and in contact with at least one surface of the microporous support.

The procedures of L. C. Scala, et al., U.S. Pat. No. 3,744,642 and J. E. Cadotte, U.S. Pat. No. 4,277,244, and M. M. Chau, U.S. Pat. No. 4,950,404, are illustrative of the fundamental method for preparing thin film composite (TFC) membranes. One of the earliest patents to describe membranes of the type used in the present invention, the '642 patent to L. C. Scala, et al. discloses the process of reacting a broad group of aliphatic or carbocyclic primary diamines with aliphatic or carbocyclic diacyl halides on a microporous support to form TFC membranes. By way of example, these procedures may be adapted to the present invention by the addition of one or more of the alkylaminopyridine catalysts disclosed herein.

In this embodiment, a nucleophilic monomer-carrying microporous support is contacted with a substantially water-immiscible organic solution of the electrophilic monomer. The nucleophilic monomers may diffuse into the organic solvent. Thus, in this embodiment the membrane is asymmetrically deposited within and/or on the microporous support material predominantly on the side of the organic solution. The contacting step may be optionally followed by the removal of excess solvent from the amine-bearing support.

The step of exposing the electrophilic monomer to the alkylaminopyridine may occur before or preferably, concurrently with the step of contacting the amine-carrying microporous support with the organic solvent volume. Nucleophilic monomers which are larger, more polar, more hydrophilic, or a combination thereof are expected to diffuse more slowly into the organic solvent phase. Furthermore, once oligomer condensation products begin to form at the organic/aqueous interface, steric and polar effects may limit the diffusion of the monomer through the film formed at such interface.

The step of contacting said amine monomer-carrying microporous support with the organic solvent volume containing said electrophilic monomer may be selected from the group consisting of (i) spraying on the organic solvent volume, (ii) coating on the organic solvent volume, (iii) immersing the amine-bearing support into the organic solvent volume, and (iv) laying the support above or below the organic solvent volume at an interface.

One embodiment includes the prior step of establishing a substantially aqueous volume containing one or more nucleophilic monomers before transferring said nucleophilic monomer to said microporous support; and, following the contacting step, the subsequent step of ceasing contact between said microporous support and the organic solvent and removing excess solvent.

The solution which carries the nucleophilic monomer comprises water and the nucleophilic monomer in an amount in the range of from about 0.1–20% by weight. The concentration of the nucleophilic monomer in the aqueous solution is determined, in part, upon the number and basicity of the amine groups per monomer molecule, the method of transferring the nucleophilic monomer to the microporous support, and the desired performance characteristics. The pH of the solution should be in the range of from about 6 to about 12.

This substantially aqueous solution may or may not contain a solvent capable of dissolving or plasticizing the microporous support. While this type of method is generally practiced with an exclusively aqueous solvent, U.S. Pat. No. 4,950,404, discloses an enhancement of flux when dissolving or plasticizing solvents such as the polar aprotic tetrahydrofuran, dimethylformamide, N-methylpyrrolidone, and sulfolane are used in concentrations of about 1–20% in the aqueous polyamine solution.

In addition, it is preferred to add a base (acid acceptor), or a surfactant to ameliorate surface tension effects, or a combination thereof. With a base to act as an acid-scavenger, less catalyst is needed to obtain a comparable film. The temperature and time of contacting can vary, according to the kind and concentration of the reactants, and the kind and concentration of the alkylaminopyridine catalyst, but contacting is generally carried out at from 0° C. to 60° C., for example, for from about 1 second to 10 minutes, and preferably from 5 seconds to 5 minutes at room temperature.

The solvent for the electrophilic reagents should be a relative non-solvent for the amide reaction product, or oligomer, and be relatively immiscible in the amine solvent. A preferred threshold of immiscibility is as follows: an organic solvent should be soluble in the amine solvent not more than between 0.01 weight percent and 1.0 weight percent. Suitable organic solvents for the acyl chloride include hydrocarbons and halogenated hydrocarbons such as n-pentane, n-hexane, cyclohexane, naphtha, and carbon tetrachloride.

Once formed, the TFC membrane may be washed to remove unreacted monomers, chemically treated with acids, bases, or other reagents to modify performance characteristics, treated with a humectant or protective coating and/or dried, stored in water until tested, further treated for environmental resistance, or otherwise used. Such post-treatments are well-known in the art (cf U.S. Pat. Nos. 5,234,598; 5,085,777; 5,051,178).

Surface Characteristics

Figure 2:
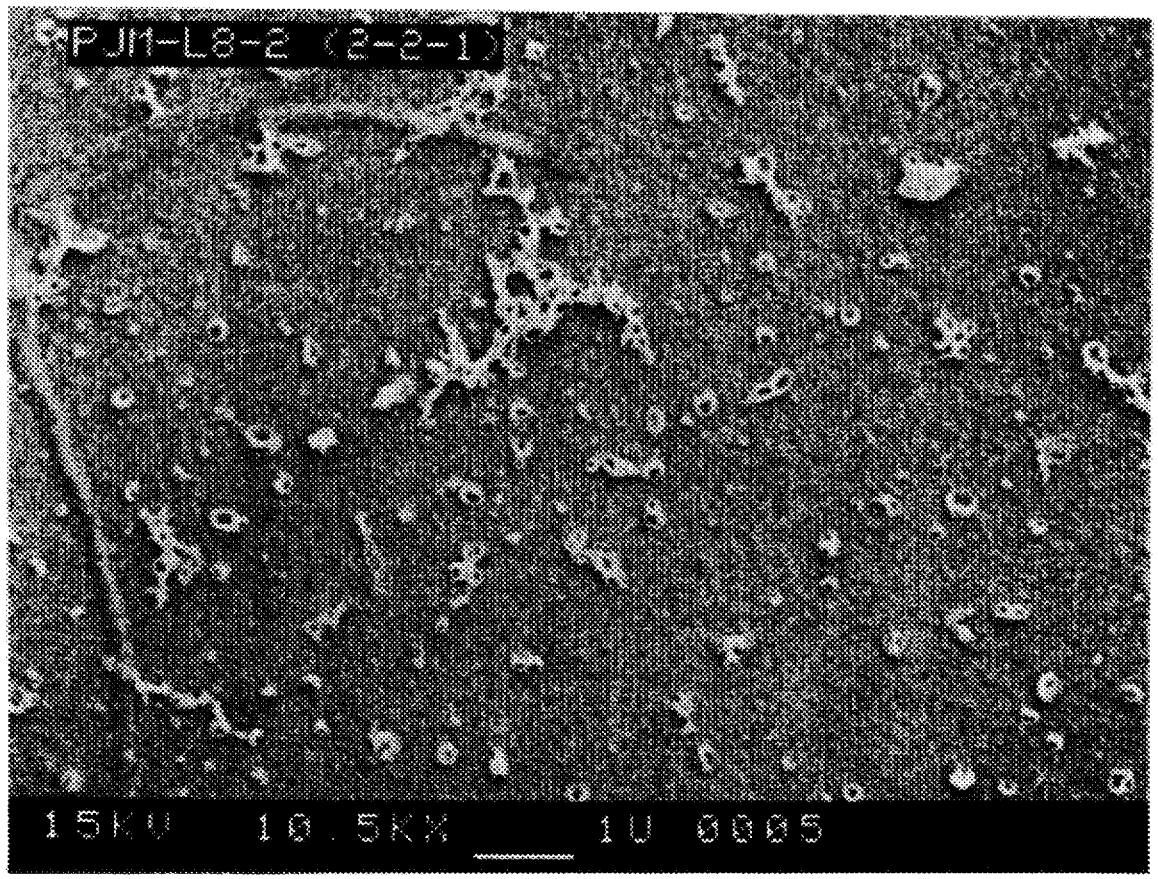
FIG. 2 shows an SEM micrograph (10,000×) of the top surface of a polyaramide membrane formed by interfacial poly condensation of 1,3-phenylene diamine and trimesoyl chloride in the presence of 4-dimethylaminopyridine in accordance with the invention.

A typical prior art TFC membrane formed from aromatic diamines interfacially reacted with triacyl halides has a nominal thickness of about 2000 Å. FIG. 1 shows a scanning electron micrograph (SEM) of the top surface of an interfacial condensation membrane formed from trimesoyl chloride and 1,3-benzenediamine. (magnification 10,000×). SEM are routinely acquired by those in the art of polymer chemistry to evaluate, in part, manufacturing methods. As seen in FIG. 1, a typical prior art TFC formed from an aromatic diamine and a triacyl halide normally has a "rough surface... [and] ... a well-developed 'ridge and valley' structure." (Peterson, R. J. and Cadotte, J. E. in "Thin Film Composite Reverse Osmosis Membranes (Chapter 5), "THE HANDBOOK OF INDUSTRIAL MEMBRANE TECH- NOLOGY (M. C. Porter, ed., 1990) at 327–328.) In contrast, as shown in FIG. 2, a TFC membrane of this invention which is formed from the same two monomers, trimesoyl chloride and 1,3-benzenediamine, has a surface appearance substantially different from the characteristic ridge and valley structure. With such relatively smooth membranes or films produced by the invention, the rate of fouling by organic materials and the rate or degree of bioadhesion and microbe adhesion is substantially reduced compared to the relatively rough-surfaced membranes of the prior art.

Referring to the surface shown in FIG. 2, for the present invention, the surface lacks pronounced ridges and valleys. Such smoothness is characteristic of the aromatic polymers or polyaramides of this invention. This changed physical appearance may be associated with improved flux, independently of the catalytic mechanism. In some embodiments, a cross-section of a membrane of this invention shows a diminished or at least more uniform thickness. Two imaging techniques with a higher resolution than SEM, which approaches molecular resolution, are atomic force microscopy (AFM) or scanning tunneling microscopy (STM). Quantative differences and threshold values for the size and frequency of the bubbles or grains may be obtained through techniques such as these. In some embodiments, the resulting membrane demonstrates improved flux relative to the same monomer combinations manufactured in the absence of the alkylaminopyridine catalyst.

Newly-Enabled Monomer Combinations

In addition to producing polymers with improved surface characteristics the use of alkylaminopyridine catalysts in the process of the invention accelerates polymerization, providing a basis for an additional aspect of this invention.

More particularly, certain monomer combinations are impractical with prior art polymerization techniques. However, the present invention affords polymerization without the low flux, thick cross-section, or slow polymerization reaction rate normally associated with these monomers. Such newly enabled combinations include monomers such as meta-xylenediamine, acid anhydrides, and isocyanates.

The present invention is further illustrated by the following examples which should in no way be construed as being further limiting. The contents of all references and issued patents cited throughout all portions of this application including the background are expressly incorporated by reference.

EXAMPLES

1. Microporous polysulfone substrate is immersed for 2 minutes in aqueous 1,3-phenylene diamine (MPD) solutions having the compositions shown in Table 1 in each case plus 0.5% triethylamine. The substrate is removed from the amine solution, excess solution removed with a squeeze roller, and the resulting substrate immersed for 20 seconds in a hexane solution of trimesoyl chloride having the composition indicated. The resulting TFC membranes are removed from the hexane solution, allowed to stand in air at ambient temperature for 1 minute, then stored in water until tested. Flux (meters/day) and rejection were measured at 25° C. and 225 psi with 2000 ppm aqueous sodium chloride solution.

TABLE 1

| Example | Wt. % MPD | Wt. % DMAP | Wt. % TMC | Flux m/d | Rejection % |
|---|---|---|---|---|---|
| 1 | 0.5 | 0.0 | 0.075 | 0.18 | 93 |
| 2 | 0.5 | 0.05 | 0.075 | 1.12 | 97 |
| 3 | 1.5 | 0.0 | 0.15 | 0.26 | 98 |
| 4 | 1.5 | 0.05 | 0.15 | 0.63 | 98 |
| 5 | 1.0 | 0.05 | 0.10 | 0.72 | 99 |
| 6 | 1.0 | 0.20 | 0.10 | 1.41 | 96 |

It is seen that the addition of a comparatively small amount of a tertiary aminopyridine catalyst greatly improved the flux compared to formulations without such catalyst, generally without loss in rejection. Similar results are obtained when:

- DMAP is replaced in whole or in part with PPY and/or MPP and/or their derivatives or equivalents;
- TMC is replaced in part with isophthaloyl chloride ("IPC") and/or terephthaloyl chloride;
- MPD is replaced in whole or in part with piperazine ("Pip"); TMC is replaced in whole or in part with cyclohexane tricarboxylic acid chloride;
- TMC is replaced in part with toluene diisocyanate, trimellitic anhydride chloride and/or pyromellitic acid dianhydride;
- MPD is replaced in part with para-phenylene diamine ("PPD");
- MPD is replaced in whole or in part with meta-xylene diamine;
- the microporous substrate is immersed first in the hexane solution of trimesoyl chloride and the resulting substrate is subsequently immersed in the aqueous solution of metaphenylene diamine.

Those skilled in the art will recognize, or be able to ascertain using no more than routine experimentation, numerous equivalents to the specific procedures described herein. Such equivalents are considered to be within the scope of this invention and are covered by the following claims:

I claim:

1. A method of making a semi-permeable polymeric film comprising the steps of imbibing into a microporous substrate a first fluid phase which comprises molecules having at least two nucleophilic substituents selected from the group consisting of primary amino substituents, secondary amino substituents, primary phosphino substituents, secondary phosphino substituents, sulfhydryl substituents, hydroxyl substituents, and combinations thereof, and optionally one or more acid acceptors and thereafter contacting said substrate with a second fluid phase which includes molecules having at least two electrophilic substituents selected from the group consisting of carboxylic acid substituents, carboxylic acid halide substituents, sulfonic acid halide substituents, carboxylic acid anhydride substituents, haloformate substituents, isocyanate substituents, carboxylic acid ester substituents, and combinations thereof, wherein at least one of said first and second phases includes at least one catalyst for the polymerization of said molecules having nucleophilic substituents with said molecules having electrophilic substituents through said nucleophilic and electrophilic substituents said at least one catalyst being regenerated during polymerization, thereby resulting in polymerization of said molecules having at least two said nucleophilic substituents with said molecules having at least two said electrophilic substituents in the shape of a film at and/or near the interface between said substrate and said second phase.

2. A method of making a semi-permeable polymeric film comprising the steps of imbibing into a microporous substrate a first fluid phase comprising molecules having at least two electrophilic substituents from the group consisting of carboxylic acid substituents, carboxylic acid halide substituents, sulfonic acid halide substituents, carboxylic acid anhydride substituents, haloformate substituents, isocyanate substituents, carboxylic acid ester substituents, and combinations thereof, and thereafter contacting said substrate with a second fluid phase which includes molecules having at least two nucleophilic substituents selected from the group consisting of primary amino substituents, secondary amino substituents, primary phosphino substituents, secondary phosphino substituents, sulfhydryl substituents, hydroxyl substituents, and combinations thereof, and optionally one or more acid acceptors, wherein at least one of said first and second phases includes at least one catalyst for the polymerization of said molecules having said electrophilic substituents with said molecules having said nucleophilic substituents through the reaction of said electrophilic substituents with said nucleophilic substituents said at least one catalyst being regenerated during polymerization, thereby resulting in polymerization of said molecules having at least two nucleophilic substituents with said molecules having at least two electrophilic substituents in the shape of a film at and/or near the interface between said substrate and said second phase.

3. A selectively permeable barrier, comprising a polymeric film prepared in accordance with claims 1 or 2 used in separating a fluid mixture into less permeating fractions and more permeating fractions.

4. A process for separating a fluid mixture into less permeating fractions and more permeating fractions, said process comprising contacting said fluid mixture with a selectively permeable barrier prepared in accordance with claims 1 or 2.

5. The method according to claims 1 or 2, in which said at least one catalyst comprises one or more tertiary aminopyridines.

6. The method according to claims 1 or 2, in which said at least one catalyst comprises one or more tertiary aminopyridines selected from the group of 4-dimethylaminopyridine, 4-pyrrolidinopyridine, 4-(4-methylpiperidino) pyridine and combinations thereof.

7. Apparatus comprising a semi-permeable polymeric film prepared according to the method of any of claims 1, 2, 5 or 6.

8. Apparatus according to claim 7 and further comprising a substrate.

9. A process for separating a fluid mixture into less permeating fractions and more permeating fractions, comprising;

A. preparing an interfacial selectively permeable membrane by:
  i. providing a microporous support having at least one principal surface;
  ii. contacting said principal surface of said microporous support with a first fluid phase including one or more compounds selected from the group consisting of: acid acceptors, polyethylenimines; reaction products of ethylene diamine, piperazine, methyl piperazine, dimethyl piperazine and/or homopiperazine with a poly epihalohydrin; amine terminated polyamide oligomers; cyclohexane diamines; cyclohexane triamines; phenylene diamines; xylylene diamines; chlorophenylene diamines;benzene triamines; bis (aminobenzyl) aniline; tetra amino benzenes; tetrakis aminomethyl methane; piperazine; methyl piperazine; homopiperazine; diaminodiphenyl methanes; N,N'-diphenyl ethylene diamine; aminobenzamides; aminobenzhydrazides; bis(alkylamino)phenylene diamines; melamine; triamino-hydroxy-pyrimidines; triamino-pyrimidines; pararosaniline; tris (aziridinyl) propionates; tetra amino biphenyls; bis (amino benzyl) anilines; mono (alkylamino) phenylene-diamines; bis (alkylamino) phenylenediamines; aminomethylpiperidine; tetra-aminopyrimidines; N-methyl-m-phenylenediamine; N,N'-dimethyl-m-phenylenediamine; and iii. subsequently contacting said microporous support with a second fluid phase comprising one or more compounds selected from the group consisting of: acid halide-terminated polyamide oligomers; benzene dicarboxylic acid halides; benzene tricarboxylic acid halides; cyclohexane dicarboxylic acid halides; cyclohexane tricarboxylic acid halides; pyridine dicarboxylic acid halides; trimellitic anhydride acid halides; benzene tetracarboxylic acid halides; pyromellitic acid di-anhydride; pyridine tricarboxylic acid halides; sebacic acid halides; azelaic acid halides; adipic acid halides; dodecanedioic acid halides; toluene diisocyanate; methylene bis (phenyl isocyanates); naphthalene diisocyanates; bitolyl diisocyanates; hexamethylene diisocyanate; phenylene diisocyanates; haloformyloxy benzene dicarboxylic acid halides;isocyanato benzene dicarboxylic acid halides; di (halosulfonyl) benzenes; halosulfonyl benzene dicarboxylic acid halides; cyclobutane dicarboxylic acid halides; dimethyl piperazine-N,N'-diformyl halides; piperazine-N,N'-diformyl halides; xylylene glycol di-haloformates; benzene diol di-haloformates; benzene triol tri-haloformates; phosgene;diphosgene; triphosgene; N,N'-carbonyl diimidazole; isocyanuric acid-N,N', N"-triacetyl halide; isocyanuric acid-N,N',N"-tripropionyl halide; and cyclopentane tetracarboxylic acid halides;

wherein at least one of said first and second fluid phases also includes at least one tertiary aminopyridine in a form catalytic for the polymerization of primary or secondary amines with said one or more compounds in said second fluid phase;

B. contacting said fluid mixture with one of said surfaces of said membrane;

C. creating a pressure gradient across said membrane in a direction to promote passage of at least one more permeating fraction from a region exterior to said membrane and adjacent to said principal surface through said membrane; and D. recovering separately one or more said less permeating fractions and one or more said more permeating fractions.

10. A process for separating a fluid mixture into less permeating fractions and more permeating fractions, comprising;

A. preparing an interfacial semi-permeable membrane by:
  i. providing a microporous support having at least one principal surface;
  ii. contacting said principal surface of said microporous support with a first fluid phase including one or more compounds selected from the group consisting of:

acid halide-terminated polyamide oligomers; benzene dicarboxylic acid halides; benzene tricarboxylic acid halides; cyclohexane dicarboxylic acid halides; cyclohexane tricarboxylic acid halides; pyridine dicarboxylic acid halides; trimellitic anhydride acid halides; benzene tetracarboxylic acid halides; pyromellitic acid di-anhydride; pyridine tricarboxylic acid halides; sebacic acid halides; azelaic acid halides; adipic acid halides; dodecanedioic acid halides; toluene diisocyanate; methylene bis (phenyl isocyanates);naphthalene diisocyanates; bitolyl diisocyanates; hexamethylene diisocyanate; phenylene diisocyanates; haloformyloxy benzene dicarboxylic acid halides; isocyanato benzene dicarboxylic acid halides; di (halosulfonyl) benzenes; halosulfonyl benzene dicarboxylic acid halides; cyclobutane dicarboxylic acid halides; dimethyl piperazine-N,N'-diformyl halides;piperazine-N,N'-diformyl halides; xylylene glycol di-haloformates; benzene diol di-haloformates; benzene triol tri-haloformates; phosgene;diphosgene; triphosgene; N,N'-carbonyl diimidazole; isocyanuric acid-N,N', N''-triacetyl halide; isocyanuric acid-N,N',N''-tripropionyl halide; and cyclopentane tetracarboxylic acid halides;

iii. subsequently contacting said microporous support with a second fluid phase comprising one or more compounds selected from the group consisting of: acid acceptors, polyethylenimines; reaction products of ethylene diamine, piperazine, methyl piperazine, dimethyl piperazine and/or homopiperazine with a poly epihalohydrin; amine terminated polyamide oligomers; cyclohexane diamines; cyclohexane triamines; phenylene diamines; xylylene diamines; chlorophenylene diamines;benzene triamines; bis (aminobenzyl) aniline; tetra amino benzenes; tetrakis aminomethyl methane; piperazine; methyl piperazine; homopiperazine; diaminodiphenyl methanes; N,N'-diphenyl ethylene diamine; aminobenzamides; aminobenzhydrazides; bis(alkyl amino)phenylene diamines; melamine; triaminohydroxy-pyrimidines; triaminopyrimidines;pararosaniline; tris (aziridinyl) propionates; tetra amino biphenyls; bis (amino benzyl) anilines; mono (alkylamino) phenylene-diamines; bis (alkylamino) phenylenediamines;aminomethylpiperidine; tetraaminopyrimidines; N-methyl-m-phenylenediamine; and N,N'-dimethyl-m-phenylenediamine; and wherein at least one of said first and second fluid phases also includes at least one tertiary aminopyridine in a form catalytic for the polymerization of primary or secondary amines with said one or more compounds in said first fluid phase;

B. contacting said fluid mixture with one of said surfaces of said membrane;

C. creating a pressure gradient across said membrane in a direction to promote passage of at least one more permeating fraction from a region exterior to said membrane and adjacent to said principal surface through said membrane; and D. recovering separately one or more said less permeating fractions and one or more said more permeating fractions.

11. A process of preparing of a permselective membrane comprising the steps of:

(a) imbibing into a microporous support an aqueous solution including piperazine and optionally one or more acid acceptors;

(b) subsequently contacting said microporous support with a substantially water-immiscible organic solution including a mixture of trimesoyl chloride and isophthaloyl chloride; wherein said aqueous solution and/or said organic solution also includes one or more tertiary aminopyridines in a form catalytic for the polymerization of said piperazine with said chlorides.

12. A process for preparation of a permselective membrane comprising the steps of:

(a) imbibing into a microporous support an aqueous solution including 1,3-phenylene diamine and optionally one or more acid acceptors;

(b) subsequently contacting said microporous support with a substantially water-immiscible organic solution including trimesoyl chloride; wherein said at least one of said aqueous solution and said organic solution also includes one or more tertiary aminopyridines in a form catalytic for the polymerization of said phenylene diamine with said chloride.

13. A process for preparation of a permselective membrane comprising the steps of:

(a) imbibing into a microporous support an aqueous solution comprising a mixture of 1,3-phenylene diamine and at least one polyhydric compound selected independently from the group consisting of ethylene glycol, propylene glycol, glycerine, polyethylene glycol, poly propylene glycol, copolymers of ethylene glycol and propylene glycol, and backbone glycols having from 4 to 12 carbon atoms and optionally one or more acid acceptors;

(b) subsequently contacting said support with a substantially water-immiscible organic solution comprising trimesoyl chloride; wherein at least one of said aqueous solution and said organic solution also includes one or more tertiary amino pyridines in a form catalytic for the polymerization of said diamine with said chloride; thereby forming a permselective membrane.

14. A process for preparation of a permselective membrane comprising the steps of:

(a) imbibing into a microporous support an aqueous solution comprising a mixture of 1,3-phenylene diamine and at least one monomeric amine salt and optionally one or more acid acceptors;

(b) subsequently contacting said support with a substantially water-immiscible organic solution comprising trimesoyl chloride; wherein at least one of said aqueous solution and said organic solution also includes one or more tertiary aminopyridines in a form catalytic for the polymerization of said diamine with said chloride; thereby forming a permselective membrane.

15. A process for preparation of a permselective membrane comprising the steps of:

(a) imbibing into a microporous support an aqueous solution including 1,3-phenylene diamine and optionally one or more acid acceptors;

(b) subsequently contacting said support with a substantially water-immiscible organic solution comprising isophthaloyl chloride and trimesoyl chloride; wherein at least one of said aqueous solution and said organic solution also includes one or more tertiary aminopyridines in a form catalytic for the polymerization of said diamine with said chlorides; thereby forming a permselective membrane.

16. A process for preparation of a permselective membrane comprising the steps of:
   (a) imbibing into a microporous support an aqueous solution including 1,3-phenylene diamine and optionally one or more acid acceptors;
   (b) subsequently contacting said support with a non-aqueous solution including cyclohexane-1,3,5-tricarboxylic acid trichloride; wherein at least one of said aqueous solution and said organic solution also includes one or more tertiary aminopyridines in a form catalytic for the polymerization of said diamine with said chloride, thereby forming a permselective membrane.

17. A process for preparation of a permselective membrane comprising the steps of:
   (a) imbibing into a microporous support an aqueous solution including 1,3-phenylene diamine and optionally effective amounts of one or more acid acceptors;
   (b) subsequently contacting said support with a substantially water-immiscible organic solution including 5-isocyanato-isophthaloyl chloride; wherein at least one of said aqueous solution and said organic solution also includes one or more tertiary aminopyridines in a form catalytic for the polymerization of said diamine with said isocyanato-isophthaloyl chloride, thereby forming a permselective membrane.

18. A process for preparation of a permselective membrane comprising the steps of:
   (a) imbibing into a microporous support an aqueous solution including a mixture of 1,3-phenylene diamine and 1,3,5-triamino benzene and optionally one or more acid acceptors;
   (b) subsequently contacting said support with a substantially water-immiscible organic solution including at least one acid chloride selected from the group consisting of trimesoyl chloride, isophthaloyl chloride and terephthaloyl chloride; wherein at least one of said aqueous solution and said organic solution also includes one or more tertiary aminopyridines in a form catalytic for the polymerization of said phenylene diamine and said triaminobenzene with said acid chloride, thereby forming a permselective membrane.

19. A process for the preparation of a permselective membrane which comprises:
   -reacting a first solution comprising a molar excess of 1,3-phenylene diamine with a second solution including a mixture of trimellitic anhydride chloride and trimesoyl chloride to form a water soluble prepolymer and optionally one or more acid acceptors; placing an aqueous third solution of said prepolymer on a microporous support to form a prepolymer film; reacting said prepolymer film with an organic fourth solution including trimesoyl chloride; wherein at least one of said first, second, third and fourth solutions also includes one or more tertiary aminopyridines in forms catalytic for the polymerization of one or more of said chlorides with one or more of said diamine and said prepolymer.

20. A process for preparation of a permselective membrane comprising the steps of:
   (a) imbibing into a microporous support an aqueous solution including 1,3-phenylene diamine and optionally one or more acid acceptors;
   (b) subsequently contacting said support with a substantially water-immiscible organic solution including 5-chloroformyloxy isophthaloyl chloride; wherein at least one of said aqueous solution and said organic solution also includes one or more tertiary aminopyridines in a form effective for the catalysis of the polymerization of said diamine with said chloride.

21. A permselective membrane prepared by any of the methods of claims 11, 12, 13, 14, 15, 16, 17, 18, 22 and 20.

22. In a process for the treatment of water, said process comprising contacting the water with a permselective membrane under pressure, the improvement comprising using a membrane of claim 21.

23. Apparatus for separating a fluid mixture into less permeable and more permeable fractions, said apparatus comprising a membrane of claim 21.

24. A method for interfacially polymerizing a thin film composite membrane comprising the steps of:
   (a) forming an aqueous mixture comprising an amine monomer, a catalytic amount of an alkylaminopyridine in free amine form, and an acid acceptor;
   (b) transferring the mixture formed in step (a) to a microporous support;
   (c) contacting the amine monomer-carrying microporous support formed in step (b) with an organic solvent comprising an acid chloride for a time and at a temperature sufficient to allow condensation polymerization to occur;
wherein the membrane formed is characterized by a substantially smooth surface when examined with scanning electron microscopy.

25. A method for interfacially polymerizing a thin film composite membrane comprising the steps of:
   (a) forming an aqueous mixture comprising an amine monomer, an amount of an alkylaminopyridine in free amine form sufficient to catalyze condensation polymerization and to act as an acceptor for acid generated by condensation polymerization;
   (b) transferring the mixture formed in step (a) to a microporous support;
   (c) contacting the amine monomer-carrying microporous support formed in step (b) with an organic solvent comprising an acid chloride for a time and at a temperature sufficient to allow condensation polymerization to occur;
wherein the membrane formed is characterized by a substantially smooth surface when examined with scanning electron microscopy.

26. A method for interfacially polymerizing a thin film composite membrane comprising the steps of:
   (a) forming an aqueous mixture comprising an amine monomer and an acid acceptor;
   (b) transferring the mixture formed in step (a) to a microporous support;
   (c) contacting the amine monomer-carrying microporous support formed in step (b) with an organic solvent comprising an acid chloride and a catalytic amount of an alkylaminopyridine in free amine form for a time and at a temperature sufficient to allow condensation polymerization to occur;
wherein the membrane formed is characterized by a substantially smooth surface when examined with scanning electron microscopy.

27. A method for interfacially polymerizing a thin film composite membrane comprising the steps of:
   (a) forming an aqueous mixture comprising an amine monomer and an acid acceptor;
   (b) transferring the mixture formed in step (a) to a microporous support;

(c) contacting the amine monomer-carrying microporous support formed in step (b) with an organic solvent comprising an acid chloride and an amount of an alkylaminopyridine in free amine form sufficient to catalyze condensation polymerization and to act as an acceptor for acid generated by condensation polymerization, for a time and at a temperature sufficient to allow condensation polymerization to occur; wherein the membrane formed is characterized by a substantially smooth surface when examined with scanning electron microscopy.

28. A membrane formed by the process of any of claims 24, 25, 26, or 27.

29. In a process for the treatment of water, said process comprising contacting the water with a permselective membrane under pressure, the improvement comprising using a membrane of claim 28.

30. Apparatus for separating a fluid mixture into less permeable and more permeable fractions, said apparatus comprising a membrane of claim 28.

31. The process of any of claims 24, 25, 26, or 27, wherein the amine monomer is selected from the group consisting of triaminobenzene, piperazine, 4-aminomethylpiperidine, 1,4-phenylene diamine, and 1,3-phenylene diamine, and combinations thereof.

32. A membrane formed by the process of claim 31.

33. In a process for the treatment of water, said process comprising contacting the water with a permselective membrane under pressure, the improvement comprising using a membrane of claim 32.

34. Apparatus for separating a fluid mixture into less permeable and more permeable fractions, said apparatus comprising a membrane of claim 32.

35. The process of any of claims 24, 25, 26, or 27, wherein the alkylaminopyridine catalyst is selected from the group consisting of 4-dimethylaminopyridine, 4-pyrrolidinopyridine, and 4-(4-methylpiperidino)pyridine, and combinations thereof.

36. A membrane formed by the process of claim 35.

37. In a process for the treatment of water, said process comprising contacting the water with a permselective membrane under pressure, the improvement comprising using a membrane of claim 36.

38. Apparatus for separating a fluid mixture into less permeable and more permeable fractions, said apparatus comprising a membrane of claim 36.

39. The process of any of claims 24, 25, 26, or 27, wherein the acid chloride is selected from the group consisting of terephthaloyl chloride, trimellitic anhydride acid chloride, 5-isocyanato isophthaloyl chloride, 5-chloroformyloxy isophthaloyl chloride, 5-chlorosulfonyl isophthaloyl chloride, isophthaloyl chloride, trimesoyl chloride, and combinations thereof.

40. A membrane formed by the process of claim 39.

41. In a process for the treatment of water, said process comprising contacting the water with a permselective membrane under pressure, the improvement comprising using a membrane of claim 40.

42. Apparatus for separating a fluid mixture into less permeable and more permeable fractions, said apparatus comprising a membrane of claim 40.

43. The process of any of claims 24, 25, 26, or 27, wherein the aqueous mixture further comprises a second amine monomer.

44. A membrane formed by the process of claim 43.

45. In a process for the treatment of water, said process comprising contacting the water with a permselective membrane under pressure, the improvement comprising using a membrane of claim 44.

46. Apparatus for separating a fluid mixture into less permeable and more permeable fractions, said apparatus comprising a membrane of claim 44.

47. The process of any of claims 24, 25, 26, or 27, wherein the alkylaminopyridine catalyst comprises at least two alkylaminopyridine moieties.

48. A membrane formed by the process of claim 47.

49. In a process for the treatment of water, said process comprising contacting the water with a permselective membrane under pressure, the improvement comprising using a membrane of claim 48.

50. Apparatus for separating a fluid mixture into less permeable and more permeable fractions, said apparatus comprising a membrane of claim 48.

51. The process of any of claims 24, 25, 26, or 27, wherein the organic solvent further comprises a second acid chloride.

52. A membrane formed by the process of claim 51.

53. In a process for the treatment of water, said process comprising contacting the water with a permselective membrane under pressure, the improvement comprising using a membrane of claim 52.

54. Apparatus for separating a fluid mixture into less permeable and more permeable fractions, said apparatus comprising a membrane of claim 52.

55. A method for interfacially polymerizing a thin film composite membrane comprising the steps of:
(a) forming an aqueous mixture comprising an amine monomer, a catalytic amount of an alkylaminopyridine in a form catalytic for the polymerization of primary or secondary amines with acid halides, and optionally an acid acceptor;
(b) transferring the mixture formed in step (a) to a microporous support;
(c) contacting the amine monomer-carrying microporous support formed in step (b) with an organic solvent comprising an acid halide for a time and at a temperature sufficient to allow condensation polymerization to occur.

56. A method for interfacially polymerizing a thin film composite membrane comprising the steps of:
(a) forming an aqueous mixture comprising an amine monomer, an amount of an alkylaminopyridine in a form catalytic for the polymerization of primary or secondary amines with acid halides sufficient to catalyze condensation polymerization and to act as an acceptor for acid generated by condensation polymerization;
(b) transferring the mixture formed in step (a) to a microporous support;
(c) contacting the amine monomer-carrying microporous support formed in step (b) with an organic solvent comprising an acid halide for a time and at a temperature sufficient to allow condensation polymerization to occur.

57. A method for interfacially polymerizing a thin film composite membrane comprising the steps of:
(a) forming an aqueous mixture comprising an amine monomer and optionally an acid acceptor;
(b) transferring the mixture formed in step (a) to a microporous support;
(c) contacting the amine monomer-carrying microporous support formed in step (b) with an organic solvent comprising an acid halide and a catalytic amount of an alkylaminopyridine in a form catalytic for the polymerization of primary or secondary amines with acid halides for a time and at a temperature sufficient to allow condensation polymerization to occur.

58. A method for interfacially polymerizing a thin film composite membrane comprising the steps of:
   (a) forming an aqueous mixture comprising an amine monomer and optionally an acid acceptor;
   (b) transferring the mixture formed in step (a) to a microporous support;
   (c) contacting the amine monomer-carrying microporous support formed in step (b) with an organic solvent comprising an acid halide and an amount of an alkylaminopyridine in a form catalytic for the polymerization of primary or secondary amines with acid halides and sufficient to catalyze condensation polymerization and to act as an acceptor for acid generated by condensation polymerization, for a time and at a temperature sufficient to allow condensation polymerization to occur.

59. A membrane formed by the process of any of claims 55, 56, 57 or 58.

60. In a process for the treatment of water, said process comprising contacting the water with a permselective membrane under pressure, the improvement comprising using a membrane of claim 59.

61. Apparatus for separating a fluid mixture into less permeable and more permeable fractions, said apparatus comprising a membrane of claim 59.

62. The process of any of claims 55, 56, 57 or 58, wherein the amine monomer is selected from the group consisting of triaminobenzene, piperazine, 4-aminomethylpiperidine, 1,4-phenylene diamine, and 1,3-phenylene diamine, and combinations thereof.

63. A membrane formed by the process of claim 62.

64. In a process for the treatment of water, said process comprising contacting the water with a permselective membrane under pressure, the improvement comprising using a membrane of claim 63.

65. Apparatus for separating a fluid mixture into less permeable and more permeable fractions, said apparatus comprising a membrane of claim 63.

66. The process of any of claims 55, 56, 57, or 58, wherein the alkylaminopyridine catalyst is selected from the group consisting of 4-dimethylaminopyridine, 4-pyrrolidinopyridine, and 4-(4-methylpiperidino)pyridine, and combinations thereof.

67. A membrane formed by the process of claim 66.

68. In a process for the treatment of water, said process comprising contacting the water with a permselective membrane under pressure, the improvement comprising using a membrane of claim 67.

69. Apparatus for separating a fluid mixture into less permeable and more permeable fractions, said apparatus comprising a membrane of claim 67.

70. The process of any of claims 55, 56, 57, or 58, wherein the acid halide is selected from the group consisting of terephthaloyl chloride, trimellitic anhydride acid chloride, 5-isocyanato isophthaloyl chloride, 5-chloroformyloxy isophthaloyl chloride, 5-chlorosulfonyl isophthaloyl chloride, isophthaloyl chloride, trimesoyl chloride, and combinations thereof.

71. A membrane formed by the process of claim 70.

72. In a process for the treatment of water, said process comprising contacting the water with a permselective membrane under pressure, the improvement comprising using a membrane of claim 71.

73. Apparatus for separating a fluid mixture into less permeable and more permeable fractions, said apparatus comprising a membrane of claim 71.

74. The process of any of claims 55, 56, 57, or 58, wherein the aqueous mixture further comprises a second amine monomer.

75. A membrane formed by the process of claim 74.

76. In a process for the treatment of water, said process comprising contacting the water with a permselective membrane under pressure, the improvement comprising using a membrane of claim 75.

77. Apparatus for separating a fluid mixture into less permeable and more permeable fractions, said apparatus comprising a membrane of claim 75.

78. The process of any of claims 55, 56, 57, or 58, wherein the alkylaminopyridine catalyst comprises at least two alkylaminopyridine moieties.

79. A membrane formed by the process of claim 78.

80. In a process for the treatment of water, said process comprising contacting the water with a permselective membrane under pressure, the improvement comprising using a membrane of claim 79.

81. Apparatus for separating a fluid mixture into less permeable and more permeable fractions, said apparatus comprising a membrane of claim 79.

82. The process of any of claims 55, 56, 57, or 58, wherein the organic solvent further comprises a second acid halide.

83. A membrane formed by the process of claim 82.

84. In a process for the treatment of water, said process comprising contacting the water with a permselective membrane under pressure, the improvement comprising using a membrane of claim 83.

85. Apparatus for separating a fluid mixture into less permeable and more permeable fractions, said apparatus comprising a membrane of claim 83.

* * * * *